United States Patent [19]

Ito et al.

[11] Patent Number: 6,131,554
[45] Date of Patent: Oct. 17, 2000

[54] ENGINE HAVING COMBUSTION CONTROL SYSTEM

[75] Inventors: Takeshi Ito; Toshiharu Hanajima; Kenji Mori, all of Iwata, Japan

[73] Assignee: Yamaha Hatsudoki Kabushiki Kaisha, Iwata, Japan

[21] Appl. No.: 09/016,199

[22] Filed: Jan. 30, 1998

[30] Foreign Application Priority Data

Jan. 31, 1997 [JP] Japan .................................. 9-018552

[51] Int. Cl.⁷ .............................. F01L 1/34; F02M 7/00
[52] U.S. Cl. .................................. 123/568.14; 123/90.15; 123/90.17; 123/306; 123/184.56; 123/403; 123/442
[58] Field of Search ................ 123/568.11, 568.14, 123/90.15, 308, 90.17, 306, 188.14, 442, 403, 336, 184.55, 184.56

[56] References Cited

U.S. PATENT DOCUMENTS

| 3,714,932 | 2/1973 | Meacham et al. .................... 123/316 |
| 4,117,813 | 10/1978 | Yamashita et al. .................. 123/334 |
| 4,336,776 | 6/1982 | Sumiyoshi et al. .................. 123/306 |
| 4,424,790 | 1/1984 | Curtil .................................. 123/559.1 |
| 4,875,455 | 10/1989 | Hashimoto et al. ................. 123/568 |
| 4,932,369 | 6/1990 | Parr .................................... 123/184.42 |
| 5,161,497 | 11/1992 | Simko et al. ........................ 123/90.15 |
| 5,293,741 | 3/1994 | Kashiyama et al. ................. 60/284 |
| 5,419,301 | 5/1995 | Schechter ............................ 123/673 |
| 5,494,008 | 2/1996 | Ohkawa et al. ..................... 123/90.17 |
| 5,515,832 | 5/1996 | Bidner et al. ....................... 123/568.14 |
| 5,564,383 | 10/1996 | Isaka et al. ......................... 123/184.56 |
| 5,575,248 | 11/1996 | Tada .................................... 123/480 |
| 5,590,632 | 1/1997 | Kato et al. .......................... 123/306 |
| 5,622,144 | 4/1997 | Nakamura et al. .................. 123/90.15 |
| 5,626,109 | 5/1997 | Yasumura et al. .................. 123/90.15 |
| 5,635,634 | 6/1997 | Reuschenbach et al. ........... 73/118.2 |
| 5,666,931 | 9/1997 | Pierik et al. ........................ 123/568.21 |
| 5,775,283 | 7/1998 | Sawai et al. ........................ 123/184.53 |
| 5,797,365 | 8/1998 | Kim .................................... 123/184.56 |
| 5,852,994 | 12/1998 | Tsuzuku et al. .................... 123/308 |
| 5,870,994 | 2/1999 | Kato .................................... 123/339.15 |

FOREIGN PATENT DOCUMENTS

0594463A1   4/1994   European Pat. Off. .

*Primary Examiner*—Tony M. Argenbright
*Assistant Examiner*—Hai Huynh
*Attorney, Agent, or Firm*—Knobbe, Martens, Olson & Bear LLP

[57] ABSTRACT

A number of embodiments of engines that improve engine performance and lean running stability by employing internal EGR controlled by controlling the volume of the intake passage between the throttle valve and the intake port in relation to the maximum combustion chamber volume.

20 Claims, 12 Drawing Sheets

ENGINE HAVING COMBUSTION CONTROL SYSTEM

BACKGROUND OF THE INVENTION

This invention relates to an internal combustion engine and more particularly to an improved construction for and method of operating such an engine to improve its performance.

As is well known, a wide variety of expedients have been resorted to in order to improve the performance of internal combustion engines. Because of the wide variety of loads and speeds under which such engines are required to operate for many applications, a great number of systems have been proposed to improve the performance under these widely varying conditions. Such devices as variable intake systems, variable valve timing, exhaust gas recirculation, feed back control and fuel injection have been employed in order to improve engine performance.

Common with most of these control strategies and systems, is the desire to maintain the engine operating in a relatively lean state under conditions when maximum power output is not required. So called "lean burn" engines have been proposed and a number of expedients have been employed for achieving good running when operating under leaner than stoichiometric fuel/air ratios.

One methodology employed to control exhaust emission is to utilize exhaust gas recirculation. The exhaust gases are recirculated from the combustion chamber back into the combustion chamber in a wide variety of manners. By doing this it is possible to control certain unwanted exhaust emissions such as nitrous oxides (NOx). However, lean burn engines have a fairly high sensitivity to the amount of exhaust gas recirculation that can be employed while still maintaining stable combustion. Thus, the combination of lean burn and exhaust gas recirculation presents substantial problems for the designer.

One way of providing exhaust gas recirculation is by operating the intake and exhaust valves in such a manner that a portion of the exhaust gases actually pass into the intake passage during the valve overlap. When this is done, the fresh charge that enters the combustion chamber through the intake passage will be partially diluted by the exhaust products that have passed into the intake system when the intake valve is first open. This is a very effective and simple way of obtaining exhaust gas recirculation and is referred to as "internal EGR". However, it is very difficult to achieve the desired control and maintain good engine performance.

It is, therefore, a principal object of this invention to provide an improved engine combustion and control system embodying internal exhaust gas recirculation.

It is a further object of this invention to provide an improved arrangement for control the amount of internal exhaust gas recirculation under running conditions and particularly idle and low load and speed range conditions.

In accordance with the invention it has been discovered that the amount of internal EGR can be very effectively controlled by controlling the relationship between the intake and exhaust valve overlap and the ratio of the volume of the induction passage between the throttle valve and the intake valve port and the volume of the combustion chamber. This ratio, hereinafter referred to as the "volume ratio" may be expressed as the ratio between the port volume, i.e., the volume of the intake passage between the throttle valve and the intake port and the exhaust gas volume, that is the maximum volume of the combustion chamber at bottom dead center position of the piston including the clearance volume.

It is, therefore, a further object of this invention to provide an improved engine combustion system and operating system wherein the volume ratio is maintained at a desired relationship relative the valve overlap in order to obtain the appropriate amount of EGR and to permit an extension of the lean running limit for good and efficient combustion.

SUMMARY OF THE INVENTION

This invention is adapted to be embodied in an internal combustion engine that is comprised of a combustion chamber that is formed by a cylinder bore closed at one end by a cylinder head and by a piston that reciprocates in the cylinder bore. At least one intake passage serves the combustion chamber through an intake port that is valved by an intake valve. A throttle valve is positioned in the intake passage upstream of the intake port for controlling the flow through the intake passage into the combustion chamber. At least one exhaust passage serves the combustion chamber for discharging exhaust gases therefrom through an exhaust port formed at the inlet end of the exhaust passage. The exhaust port is valved by an exhaust valve. Valve actuating means control the opening and closing of the intake and exhaust valves.

In accordance with an engine operating the invention, a volume ratio is established which is equal to the ratio of the volume of the intake passage between the throttle valve and the intake port and the maximum cylinder volume at bottom dead center position that is related to the overlap period when both the intake and the exhaust valves are open.

In accordance with a method for practicing the invention, the desired volume ratio is maintained in relation to the degree of valve overlap.

DETAILED DESCRIPTION OF THE PREFERRED EMBODIMENTS OF THE INVENTION

Figure 1:
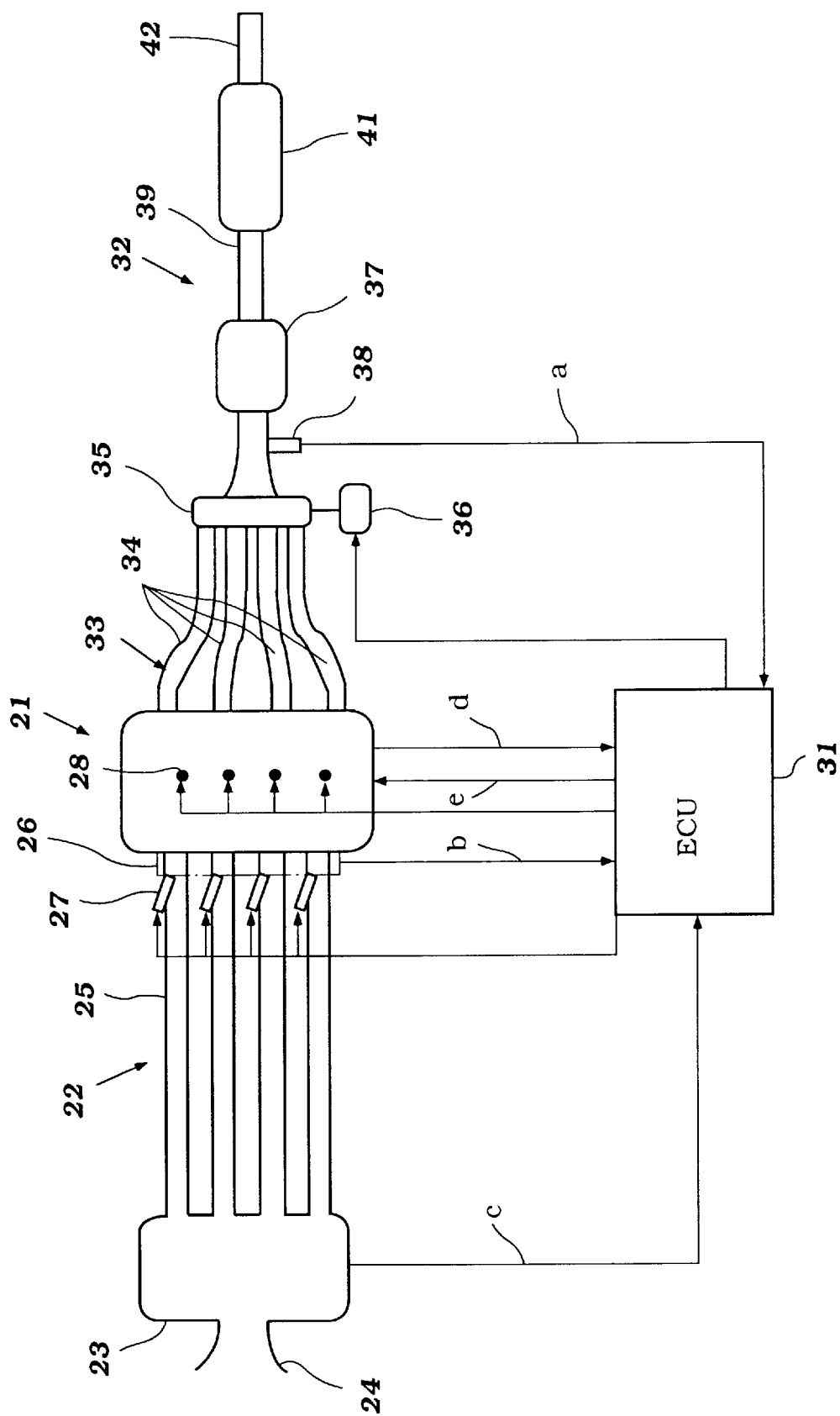
FIG. 1 is a partially schematic, top plan view of an internal combustion engine and control system constructed and operated in accordance with an embodiment of the invention.

Referring now in detail to the drawings and initially to FIG. 1, an engine constructed in accordance with a first embodiment of the invention indicated generally by the reference numeral 21 and is shown in part schematically with the various controls therefor. The engine 21 has an internal construction which will be described in more detail by reference through FIGS. 2 through 4.

The engine 21 is provided with an induction system, indicated generally by the reference numeral 22, which is comprised of a plenum chamber 23 that draws air from the atmosphere through an atmospheric air inlet opening 24. The plenum chamber 23 may include a silencing arrangement and/or filtering arrangement for silencing the air flow sound and/or filtering foreign particles from the inducted air. A plurality of intake runners 25 extend from the plenum chamber 23 to the individual cylinders of the engine through a control or throttle valve body 26 in a manner which will be described also in detail later by reference to FIGS. 2 through 4.

In accordance with the invention, a fuel/air charge is formed in mixture with the air inducted in a manner previously described. This fuel/air charge is formed in this embodiment, by a plurality of fuel injectors 27, which are of the manifold type and which also will also be described in more detail later by reference to FIGS. 2 through 4.

The charge which is admitted to the combustion chambers of the engine through the induction system 22 thus far described is fired by spark plugs 28 that are mounted in the cylinder head assembly of the engine. Any suitable ignition system may be employed for this purpose and as illustrated, this ignition system is controlled by an ECU 31. The control strategy will be described in more detail later.

An exhaust system, indicated generally by the reference numeral 32, is provided for collecting the exhaust gases exiting the engine combustion chambers and discharging them to the atmosphere. This exhaust system includes an exhaust manifold, indicated generally by the reference numeral 33 and which is comprised of a plurality of branch runners 34 each of which collects the exhaust gases from a respective cylinder.

The exhaust manifold 33 delivers the exhaust gasses to an exhaust control valve 35. The exhaust control valve 35 is operated by means of a servomotor 36 under the control of the ECU 31 so as to provide the desired tuning for the exhaust gas discharge to optimize engine performance.

Downstream of the exhaust control valve 35 there is provided a catalytic converter 37 of a known type. A sensor such as an oxygen sensor 38 is provided in an exhaust pipe 39 upstream of the catalytic converter 37 and supplies information to the ECU for a feedback control. The oxygen sensor output is indicated by the reference character "a" in this figure.

Finally, the exhaust pipe 39 delivers the exhaust gases to a silencer 41 for discharge to the atmosphere through a tail pipe 42.

As has been noted, the ECU 31 controls the engine in addition to the firing of the spark plugs 28 and the exhaust control valve 35 by controlling the timing and duration of fuel injection from the injector 27. Certain additional inputs to that from the oxygen sensor 37 are supplied to the ECU for control purposes and they will be described shortly.

Figure 2:
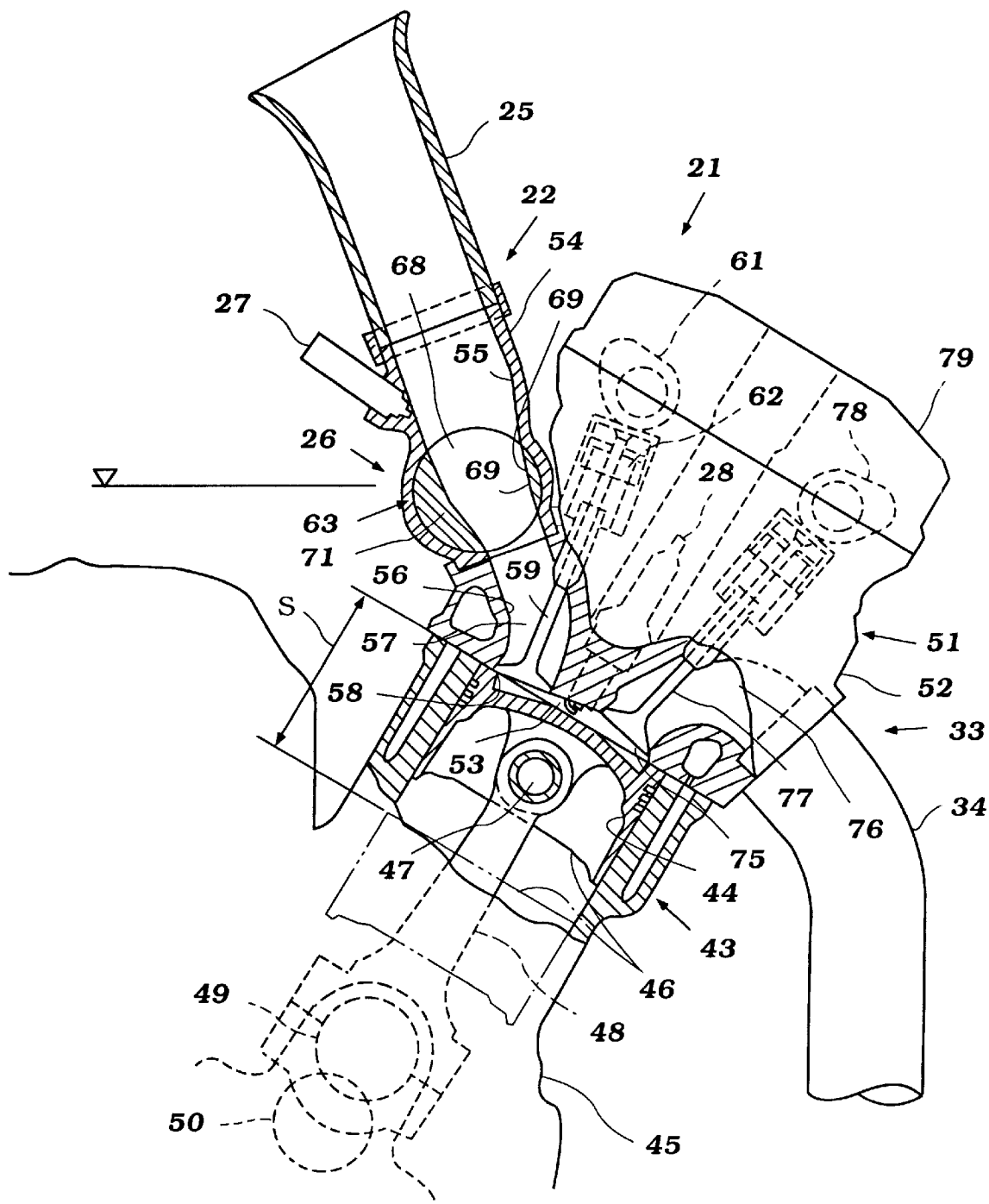
FIG. 2 is an enlarged side elevational view of the engine, with a portion broken away and shown in section and showing the throttle valve in a fully opened position.
Figure 3:
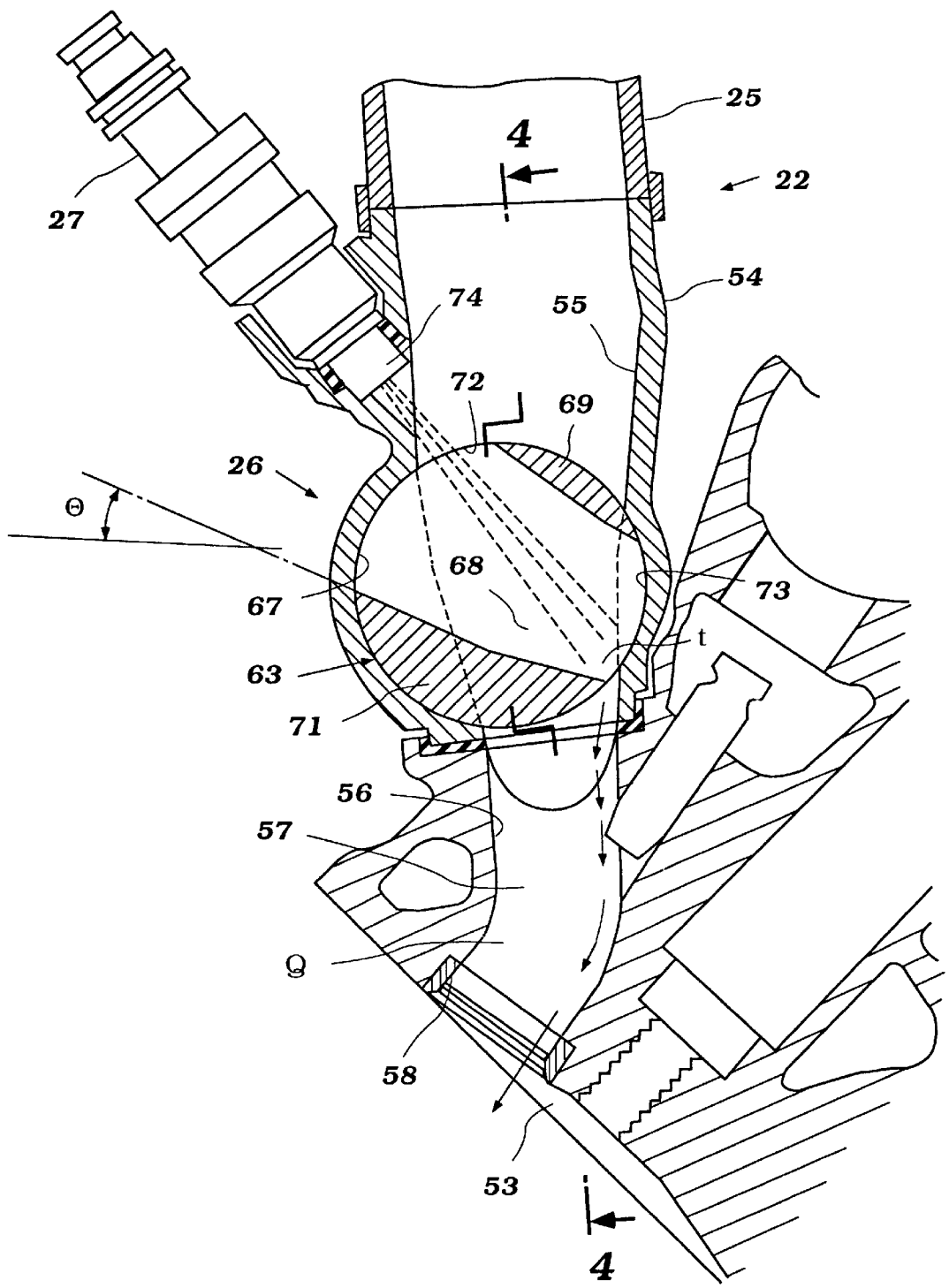
FIG. 3 is an enlarged cross-sectional view in the area shown in cross section in FIG. 2 showing the throttle valve in the fully closed or idle position.
Figure 4:
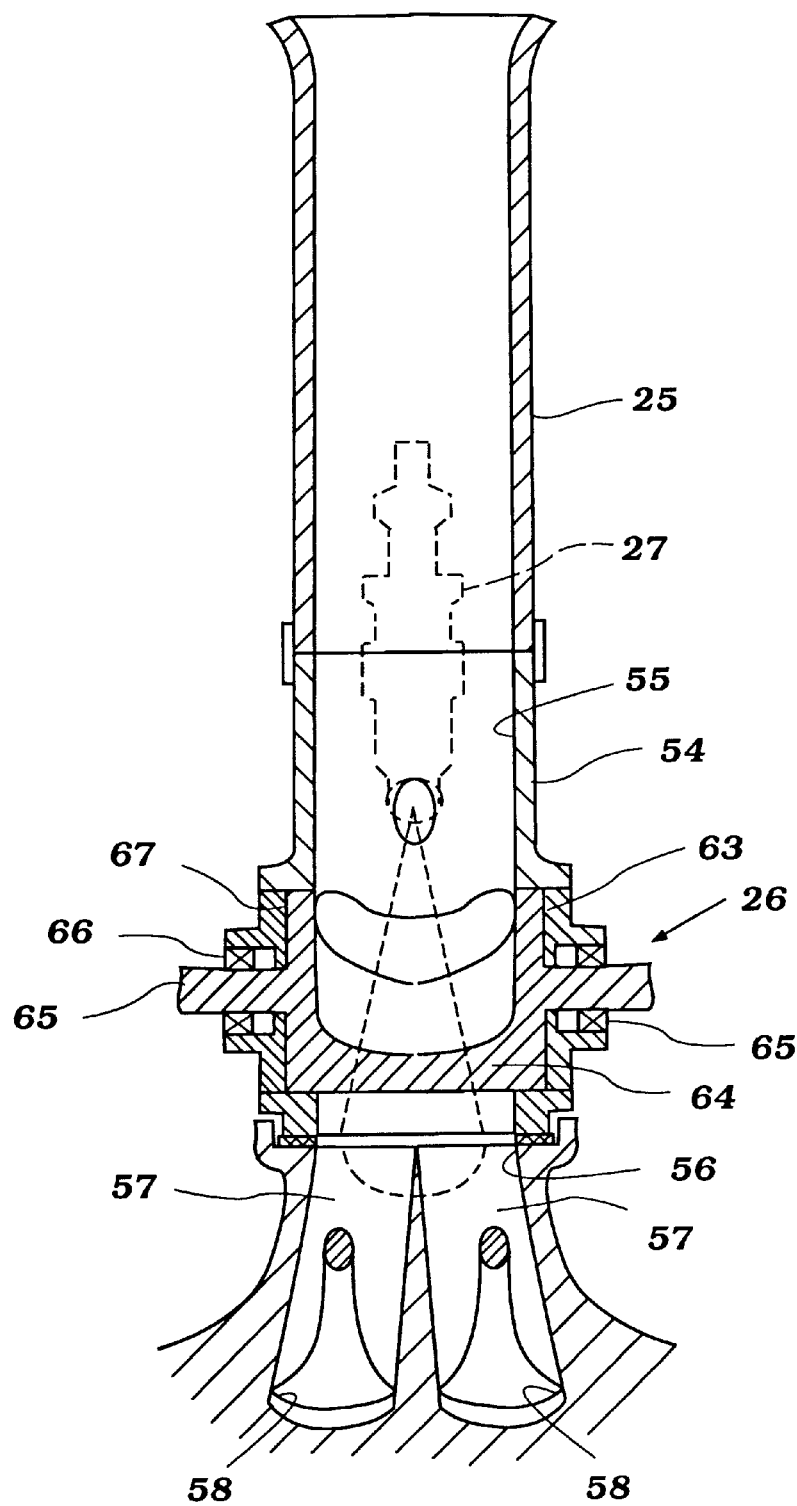
FIG. 4 is a cross-sectional view taken along the line 4—4 of FIG. 3.

Referring now in detail to the internal components of the engine and specifically by reference to FIGS. 2–4, the engine 21 is comprised of a cylinder block 43 in which a plurality of aligned cylinder bores 44 are formed. Although the invention is described in conjunction with an inline four-cylinder engine, it will be readily apparent to those of skill in the art that the invention may be utilized in a wide variety of types of engines having different configurations.

The cylinder block 43 has a crankcase 45 formed at its lower end in which a crankshaft 50 is journaled for rotation in any known manner. Pistons 46 are supported for reciprocation in each of the cylinder bores 44. The pistons 46 are connected by means of piston pins 47 to the upper or small ends of connecting rods 48. The big ends of the connecting rods 48 are journaled on the throws 49 of the crankshaft 50.

A cylinder head assembly, indicated generally by the reference numeral 51 is affixed in a known manner to the cylinder block 43 and closes the upper ends of the cylinder bores 44. The cylinder head assembly 51 includes a main cylinder head member 52 which has recesses 53 that cooperate with the cylinder bores 44 and pistons 46 to form the combustion chambers of the engine.

As has already been noted by reference to FIG. 1, the induction system 22 supplies a charge to the combustion chambers 53 for combustion therein. The induction system 22 includes the manifold runners 25 which are shown partially in FIGS. 2–4 and which terminate at the throttle body 26. The throttle body 26 has individual portions 54 in which passages 55 are formed that are aligned with the passages of the manifold runners 25. These throttle body passages 55 communicate with cylinder head intake passages 56.

In the illustrated embodiment, the engines of the four valve per cylinder type and hence the intake passages 56 are divided into a pair of branch portions 57 each of which terminates at a respective intake port 58. The intake ports 58 are valved by poppet-type intake valves 59. These valves 59 are operated from an intake cam shaft 61 that is rotatably journaled in the cylinder head assembly 51 in a known manner. The lobes of the intake cam shaft 61 cooperate with thimble tappet 62 for operating the intake valves 59 against the action of their return springs in a well-known manner.

A combined throttle and tumble valve assembly, indicated generally by the reference numeral 63 is mounted in the throttle body 26 for controlling the air flow into the combustion chambers and also the direction of the air flow. The throttle valve 63 includes a main valve element 64 having a shaft portion 65 journaled on bearings 66 in the throttle body 54. This main valve element 64 is mounted for rotation in a generally cylindrical recess 67 formed in the throttle body 54.

The main valve element 64 has a generally cylindrical configuration that is formed with a central cutout 68 that is defined between a pair of side portions 69 and 71. This cutout 68 forms a passage an inlet opening 72 and a discharge opening 73. In the closed or idle position as shown in FIG. 3, the inlet opening 72 is substantially restricted and the discharge opening 73 is likewise restricted to a throat portion having a throat area "t". This throat area t is disposed at one side of the intake passages 57. Hence, the air flow will be directed toward one side of these passages and will enter the cylinder bore 44 through one side of the valve ports 58 as shown by the arrows in FIG. 3 to effect a tumble action in the combustion chamber. This tumble action has been found to improve turbulence and effect more rapid flame propagation at low speed/low load conditions to ensure complete combustion.

It may be seen that the angle of the lower surface of the throttle valve portion 63 is disposed at an angle θ so that the air charge will be channeled toward the respective side of the intake passages 57.

In this embodiment, the fuel injector 27 is mounted so that its discharge nozzle 74 is disposed to spray into the open part 72 of the throttle valve passage 68. As the speed and load on the engine increase, the throttle valve 63 is opened in a known manner. As a result, the degree of tumble and flow restriction is progressively reduced so that there will be no restriction to free breathing under wide open throttle conditions. In addition, the charge flow will not be redirected under this condition so that charging efficiency can be maximized.

It will also be seen from FIG. 3 that the mounting of the fuel injector 27 and specifically its nozzle portion 74 will cause the fuel spray to be directed through the throat section t when operating at idle or off idle conditions. At full throttle, as seen in FIG. 2, the fuel spray can pass directly into the induction passage opening 56.

The intake port 58 are disposed at substantially one side of a plane containing the axis of the cylinder bore 44. Two exhaust ports 75 are formed on the opposite side of this plane. These exhaust ports 75 communicate with exhaust passages 76 which, in turn, communicate with the runners 34 of the exhaust manifold 33. Poppet-type exhaust valves 77 are supported in the cylinder head assembly 51 for controlling the opening and closing of the exhaust ports 75.

An exhaust cam shaft 78 is driven from the crankshaft either directly or indirectly through the intake cam shaft 61. The intake and exhaust cam shafts 61 and 78 are driven at one-half crankshaft speed as is well known in this art. In addition, a variable valve timing mechanism is associated with one or both of the cam shafts 61 and 78 for varying the overlap between the closing of the exhaust valve and the opening of the intake valve, for reasons which will be described.

The valve mechanism is closed by means of a cam cover 79 that is affixed to the cylinder head member 52 in a known manner.

In accordance with an important feature of the invention, the volume of the portion of the intake passage comprised primarily of the cylinder head portion 57 downstream of the closed position of the throttle valve 71 when in the position shown in FIG. 3 and the intake valve port 58 is related to the combustion chamber volume in a specific ratio, as will be set forth. The combustion chamber volume is determined as the volume when the piston 46 is at the bottom of its stroke S as shown in the phantom line position. This volume is determined by multiplying the bore area by the stroke S and adding the volume of the cylinder head recess 53. The downstream volume of the intake passage is indicated by the reference character Q and the volume ratio of Q to the cylinder volume ratio, indicated as S, is shown in some of the remaining figures and will be described by reference to them.

Basically, it has been found that if the valve overlap is varied relative to the ratio Q/S in certain relationships the internal EGR can be controlled so as to improve running and permit leaner operation, particularly at idle and low speed conditions, which are the most difficult for obtaining a wide degree of what is known as EGR tolerence. This is the tolerance whereby the EGR can be maximized without causing uneven running.

Figure 5:
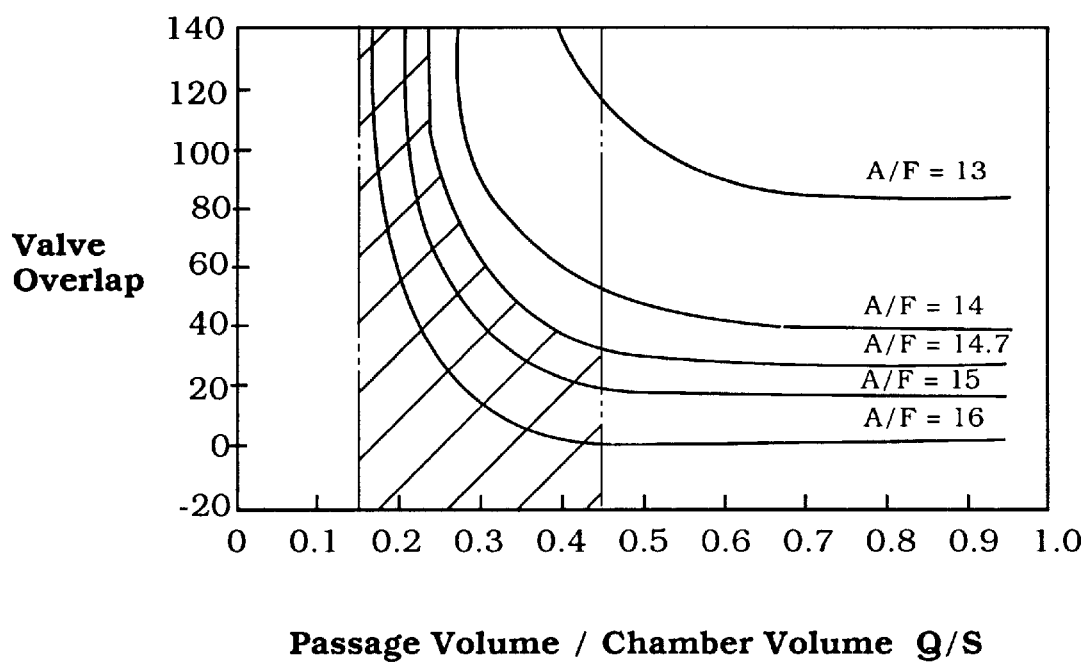
FIG. 5 is a graphical view showing series of curves depicting valve overlap and volume ratio for a range of stabilized combustion air/fuel ratios.

FIG. 5 is a graphical view showing a family of air/fuel ratio curves that indicate the condition where the lower limit of smooth running occurs for varying ratios of intake passage volume to chamber volume and varying degrees of valve overlap. As may be seen, this ratio Q/S gets greater than about 45% (0.45) the curves are generally flat. However, as the ratios become lower the curves increase rather asymptotically when the volume ratio Q/S decreases. It is desirable to operate in the leaner than stoichiometric range and hence it is preferred to be able to operate in the shaded area of this curve in order to obtain lean burning and good combustion.

Figure 6:
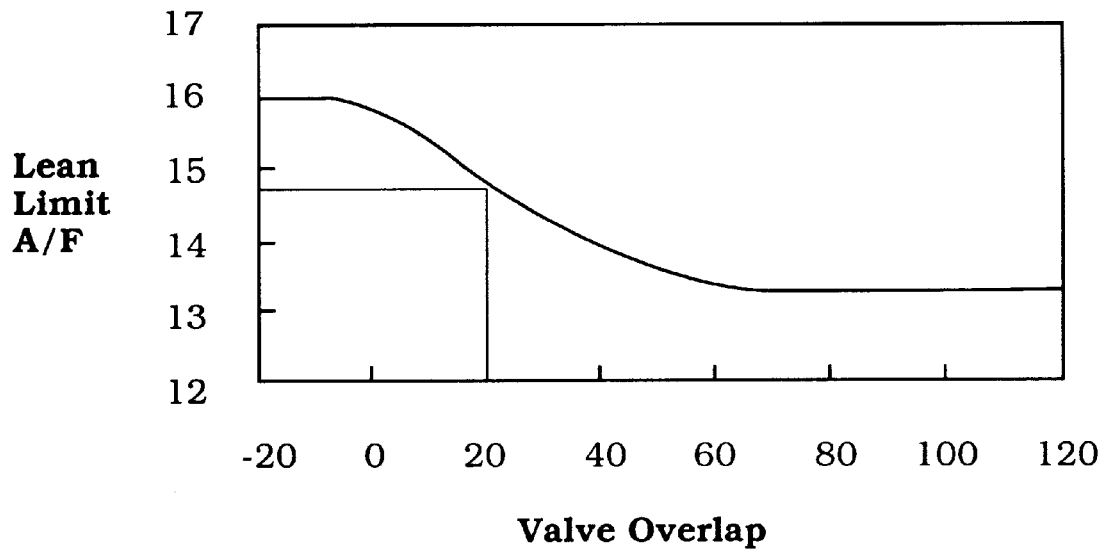
FIG. 6 is a graphical view showing the relationship of the lean limit air/fuel ratio for stable combustion with varying valve overlap timing and with a volume ratio of 0.56.

FIG. 6 is a graphical view showing again the lean limit air/fuel ratio in a different form with respect to valve overlap and assuming the passage to combustion chamber volume ratio of 0.56. Again, by utilizing this relationship it is possible to determine when it is possible to have smooth running by operating at leaner than stoichiometric air/fuel ratio.

Figure 7:
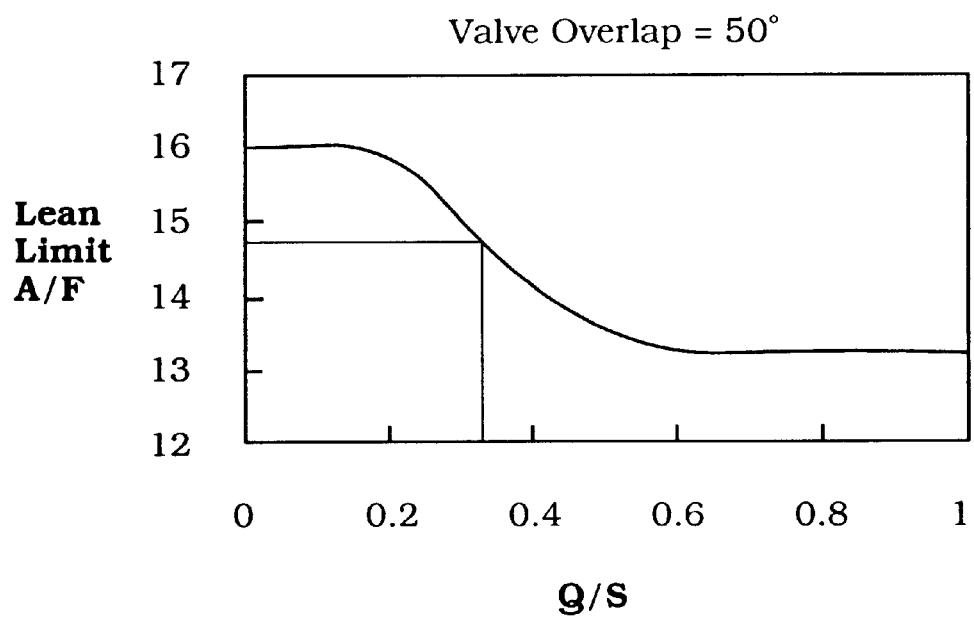
FIG. 7 is a graphical view, in part similar to FIG. 6, showing the lean limit air/fuel ratio in relation to volume ratio and wherein the valve overlap is at 50%.

FIG. 7 is a graphical view showing the condition when the valve overlap is maintained at 50° and how the lean limit air/fuel ratio varies with variations in the Q/S ratio. Again, this indicates the desirable ranges for operating in lean burn and still obtaining smooth combustion.

Figure 8:
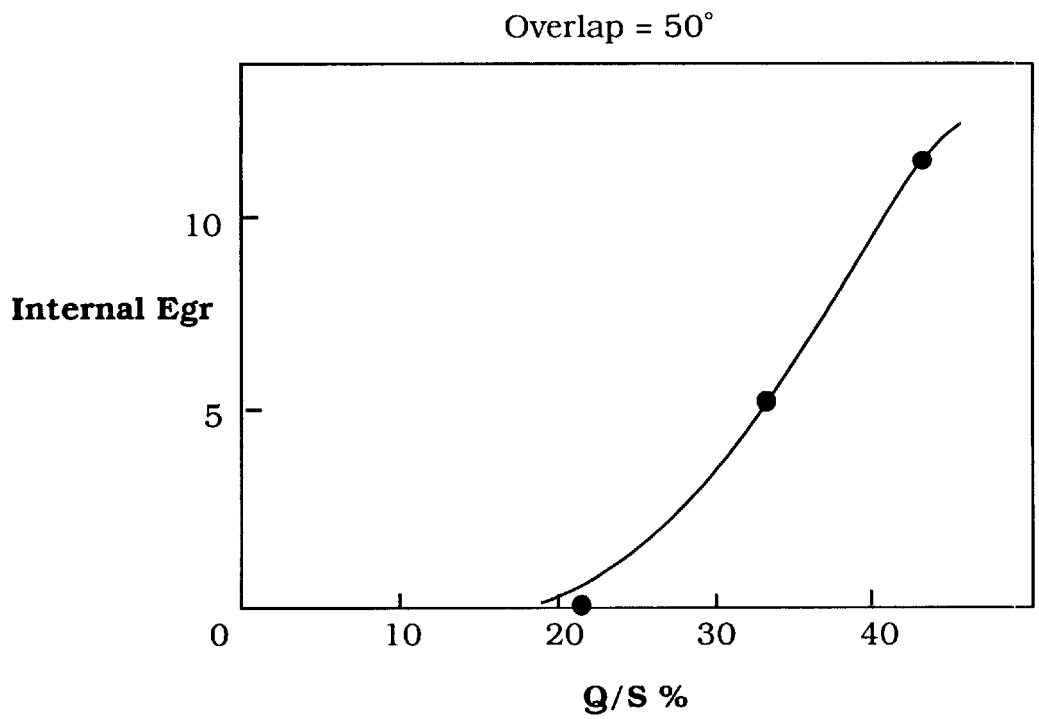
FIG. 8 is a graphical view showing the internal EGR ratio at varying volume ratios for a valve overlap of fifty degrees (50°) when operating in the idle speed.
Figure 9:
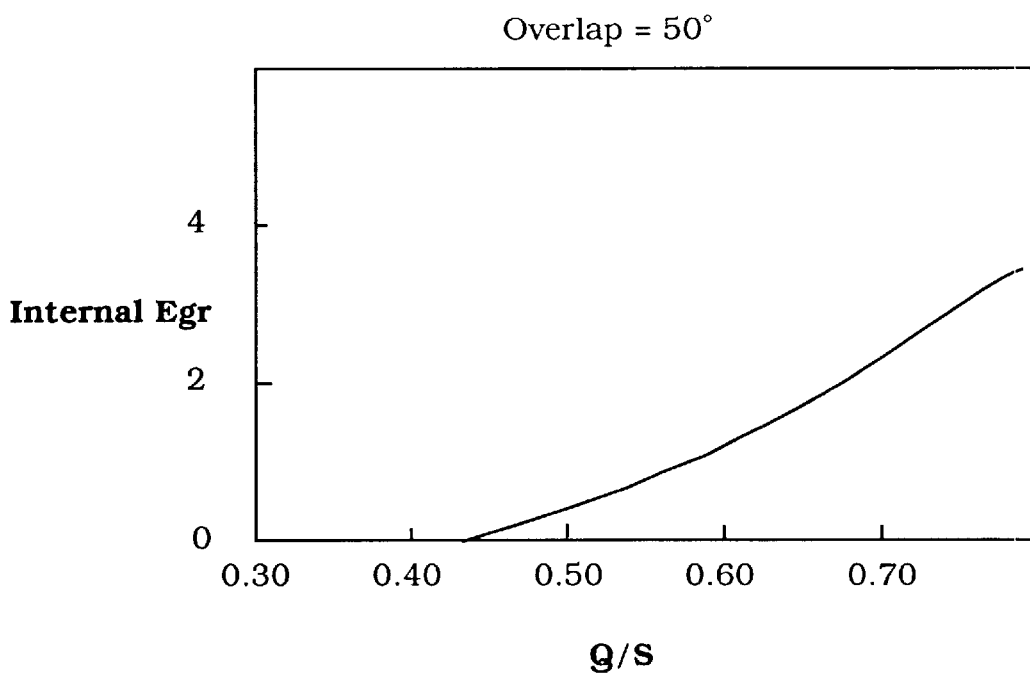
FIG. 9 is a graphical view, in part similar to FIG. 8, and shows the relationship when operating under the low load range.

Finally, FIGS. 8 and 9 show the actual amount of internal EGR when the volume ratio Q/S is varied and the valve overlap is maintained at 50°. FIG. 8 depicts the running condition under idle when the throttle valve is held in the position shown in FIG. 3. As may be seen, as the Q/S ratio increases and with the valve overlap being held at 50°, the amount of internal EGR substantially increases. This is because there is more volume in which the exhaust gases may be trapped between the throttle valve and the intake port as this volume is increased, all other factors being held constant. The effect of this when operating an off idle, as shown in FIG. 9 is substantially reduced.

Thus, it has been found that the most desirable conditions are to maintain the Q/S ratio in the range of 0.15 to 0.45 (15–45%) and to maintain the valve overlap within the range of 30–140°. These ratios are found to provide the maximum lean burn ability while maintaining smooth combustion.

Referring again to FIG. 1, this figure shows the ECU control for the various components. As already has been noted, the ECU 31 provides a feedback control based upon the signal a from the oxygen sensor 38. In addition, there is a signal "b" which indicates the position of the throttle valve 26 and a signal "c" which indicates the intake air temperature. Furthermore, there is a signal "d" which provides an indication of engine crankshaft speed.

The ECU output control signals to the fuel injector 27 and to the exhaust control valve servomotor 36. In addition, a signal indicated at "e" is sent out to the controller for controlling the variable valve timing mechanism to maintain the valve timing within the desired range. It is to be understood that the invention may be utilized also in conjunction with engines that do not employ a variable valve timing mechanism but wherein the valve timing is set within the aforenoted parameters. However, by using variable valve timing for the engine, then a wider range of control latitude is possible and further improvement in engine performance can be obtained, particularly at idle and low and mid-range conditions.

Figure 10:
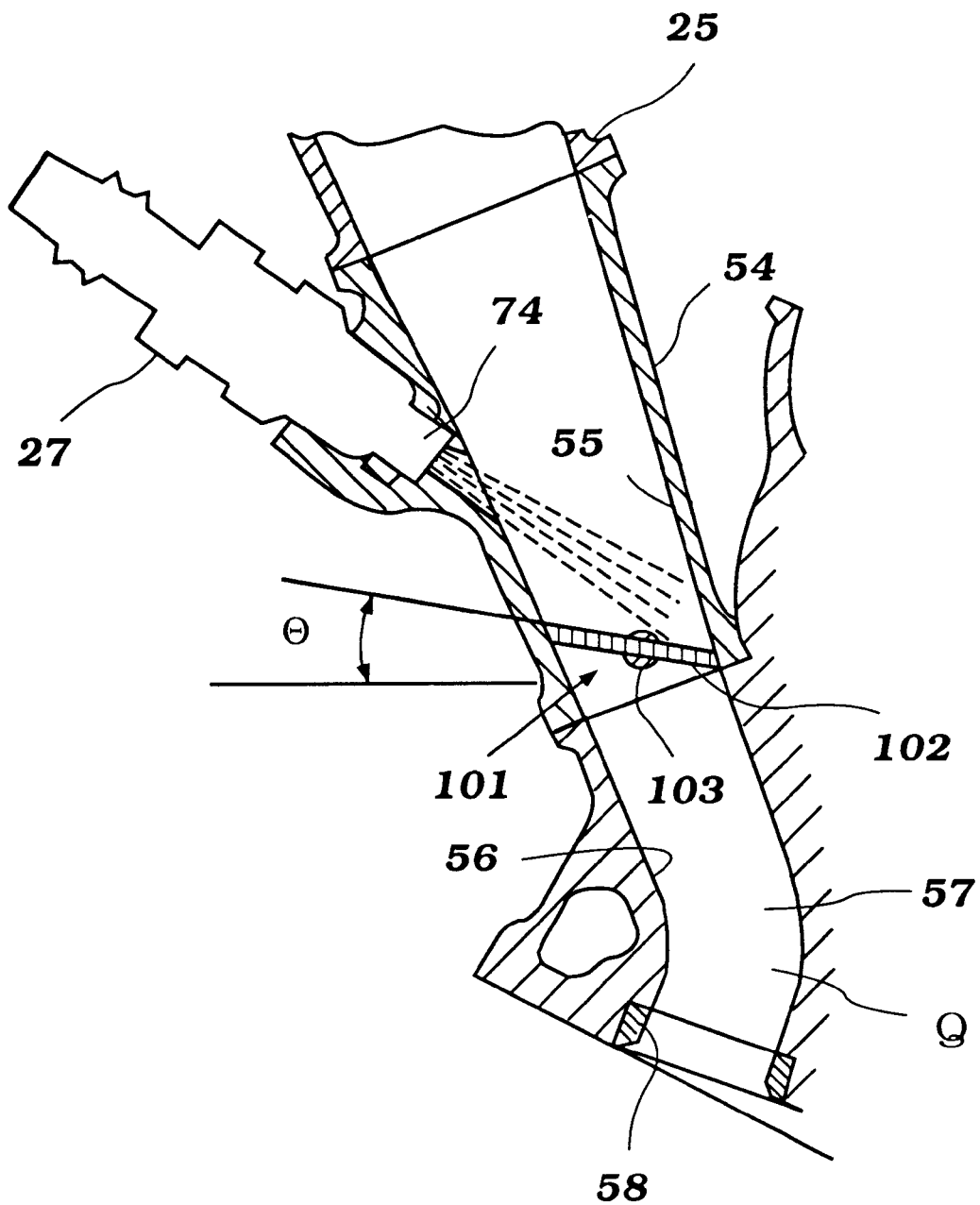
FIG. 10 is a cross-sectional view, in part similar to FIG. 3 and shows another embodiment of the invention differing from the previous embodiment in the type of throttle valve employed.

FIG. 10 is a view in part similar to FIG. 3 but shows another embodiment of the invention. Except for the use of a butterfly type throttle valve, indicated generally by the reference numeral 101, instead of the configured type throttle valve 63 of the previous embodiment, this embodiment is otherwise the same as that previously described. For that reason, only a single figure is believed to be necessary to illustrate and describe this embodiment.

Figure 11:
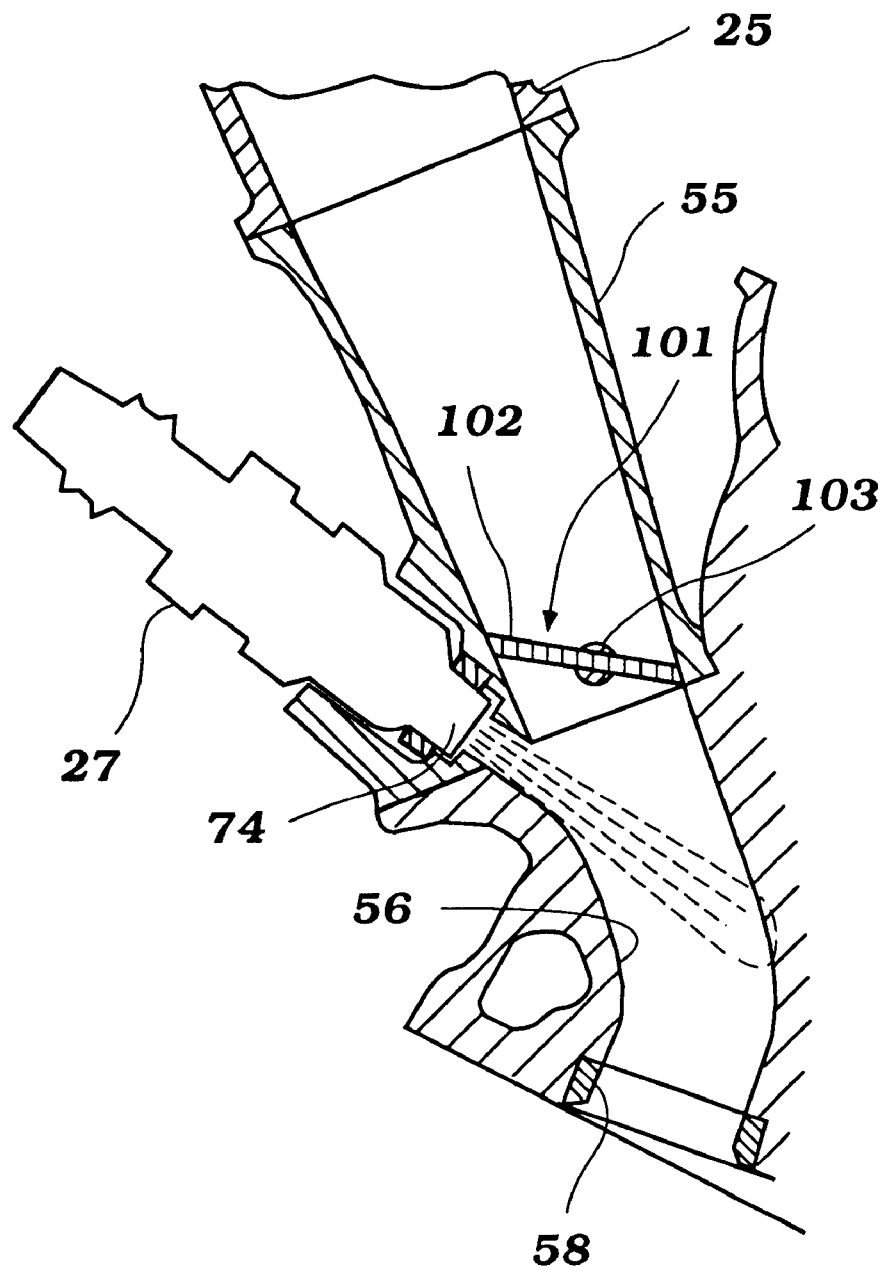
FIG. 11 is a cross-sectional view in part similar to FIGS. 3 and 10 and shows another embodiment utilizing a throttle valve of the type shown in FIG. 10, but a different position for the fuel injector.

Like components are identified by the same reference numeral in this embodiment as in the previous embodiments. In this embodiment, a plate-type throttle valve plate 102 is affixed to a throttle valve shaft 103 that is journaled in the throttle body 54. In the idle position the throttle angle is shown by the angle θ and again the flow will pass through one side of the intake passages 57 and generate a tumble action. Again, the fuel injector 27 sprays toward this area FIG. 11 shows another embodiment which is basically the same as FIG. 10 and utilizes the same butterfly type throttle valve 101. In this embodiment, however, the fuel injector 27 and its nozzle portion 74 is positioned downstream of the throttle valve 101. In this way, the spray from the fuel injector will not deposit on the plate portion 102 of the throttle valve. Again, however, the spray is toward the direction where the tumble occurs so as to improve fuel distribution when operating under low speeds and low loads and small throttle openings.

Figure 12:
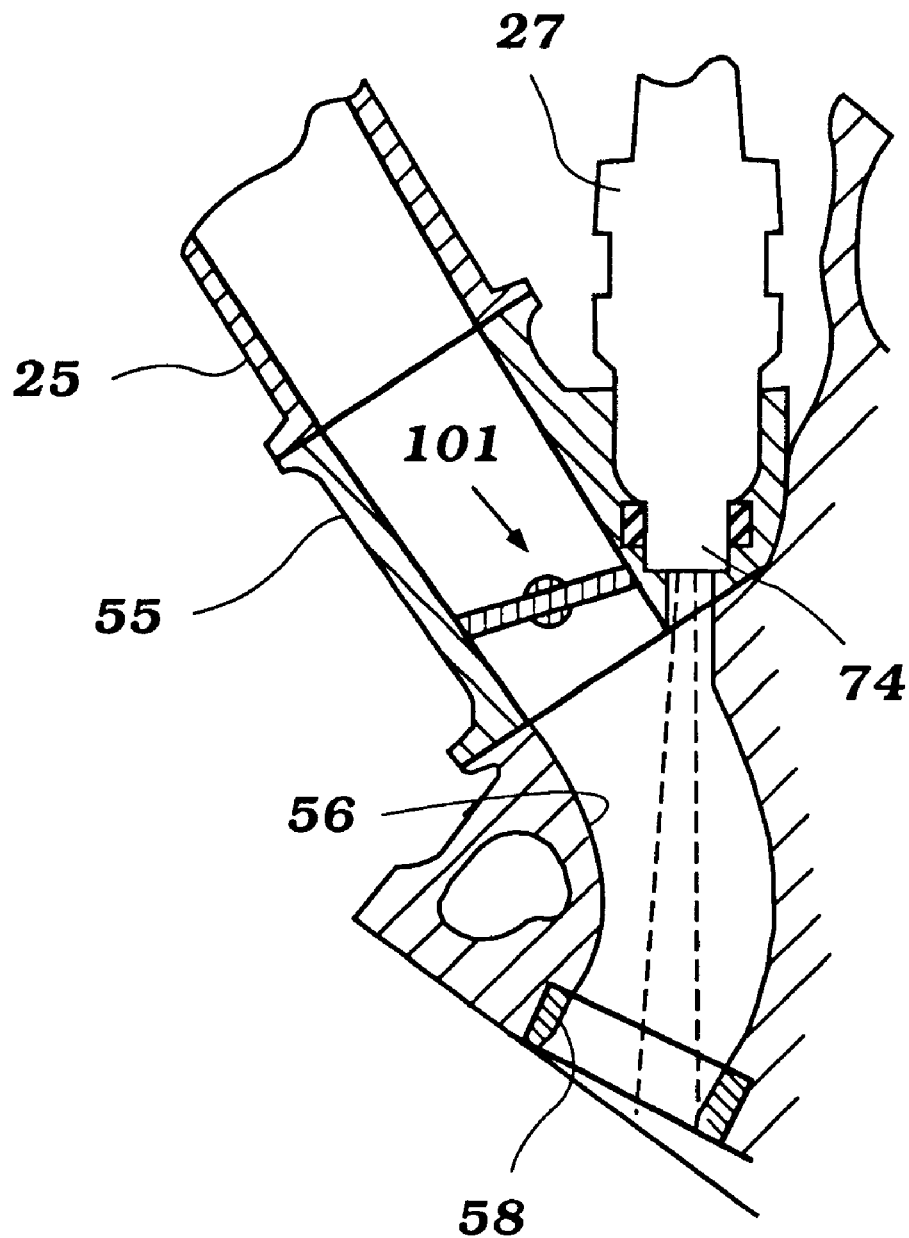
FIG. 12 is a cross-sectional view, in part similar to FIGS. 3, 10, and 11, and shows another alternative position for the fuel injector employing a butterfly type throttle valve.

FIG. 12 shows another embodiment which is similar to the embodiment of FIG. 11. In this embodiment, however, the fuel injector 27 is mounted on the opposite side of the throttle body 55 from the previous embodiments. This permits the spray pattern to be directed toward the intake ports 58 and on the side where the tumble is generated when operating at idle and low speeds.

Figure 13:
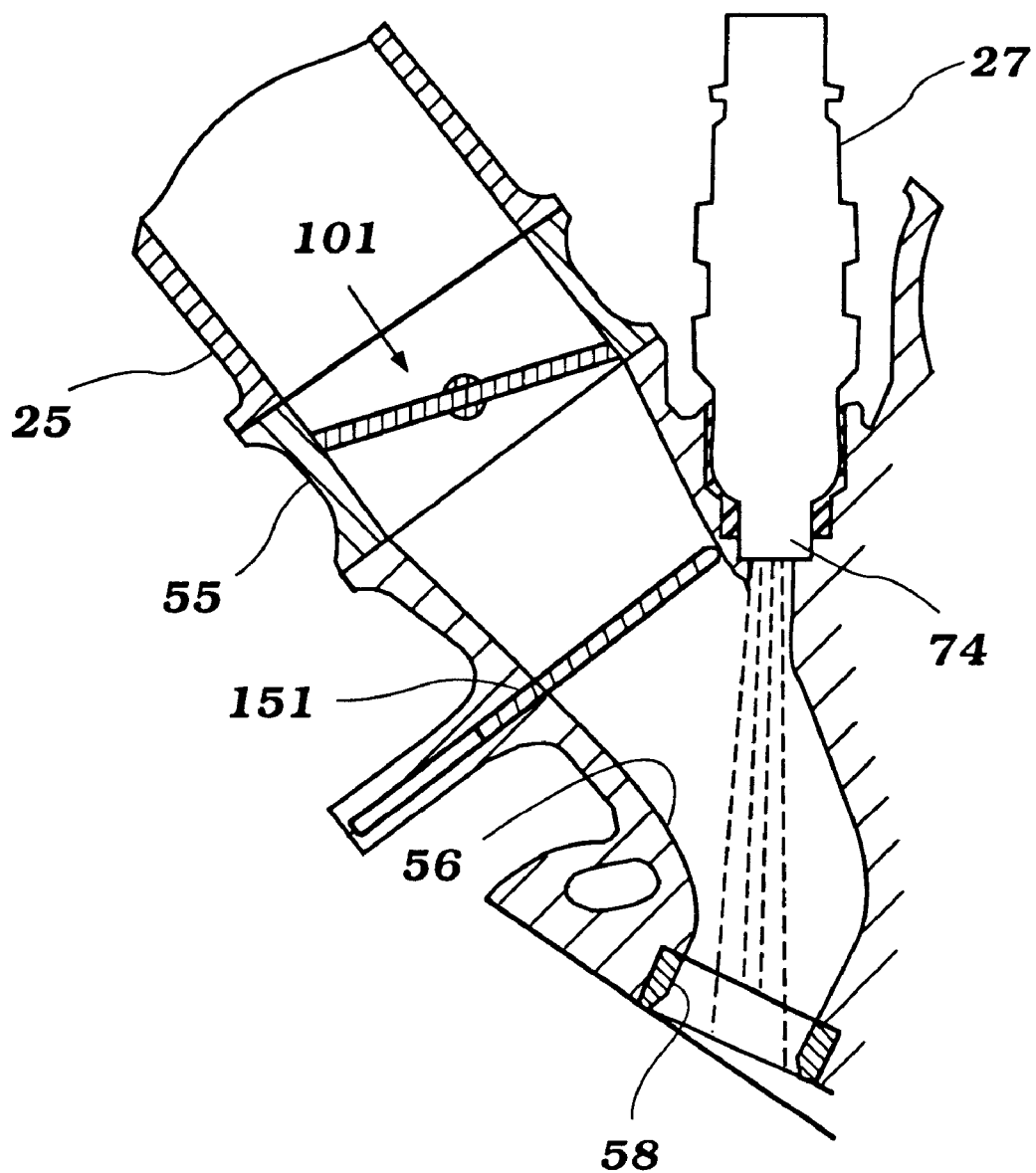
FIG. 13 is a cross-sectional view, in part similar to FIGS. 3, 10, 11, and 12 and shows another arrangement wherein a further valve is employed for varying the intake passage volume.

FIG. 13 is another embodiment which is generally similar to the embodiment of FIG. 12. In this embodiment, however, the butterfly-type throttle valve 101 is placed in a more upstream fashion so as to allow a larger maximum volume for the downstream intake passage portion. This volume can be varied, however, through the use of a plate-type slide control valve 151 which is mounted directly in the cylinder head. In the position shown in FIG. 13, the effective volume Q is substantially restricted from when the valve 151 is in its fully opened position so as to permit a wider latitude of tuning for suiting various engine running conditions.

Figure 14:
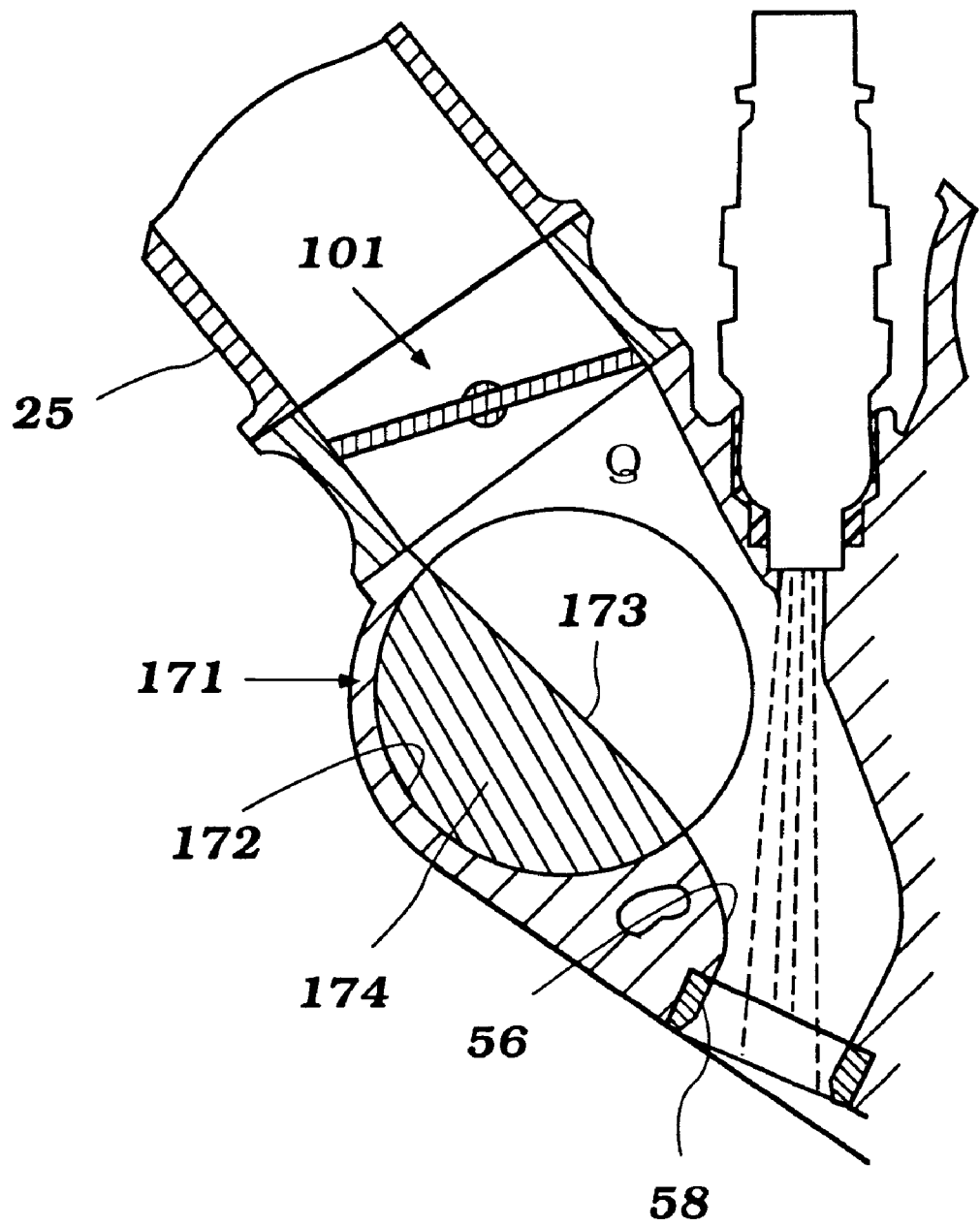
FIG. 14 is a cross-sectional view, in part similar to FIGS. 3, 10, 11, 12, and 13, and shows another arrangement for varying the effective volume of the intake passage.

FIG. 14 shows still another way in which the volume of the intake passage can be varied and again uses a butterfly-type throttle valve 101. In this embodiment, there is a valve element 171 that is mounted in a cylindrical recess 172 formed at one side of the cylinder head and which valve has a cutout portion 173. Thus, when the valve body 174 having the cutout 173 is in the position shown in FIG. 14, the volume Q is maximized. However, by rotating the valve so that the body 174 occupies the volume Q, the effective volume Q can be reduced so as to permit adjustment both of the volume and the valve timing.

Thus, from the foregoing description it should be readily apparent that the described embodiments of the invention provide very effective ways in which the internal EGR may be varied during engine running so as to permit leaner burning under idle and low speeds because of the resulting internal EGR. Of course, the foregoing description is that of preferred embodiments of the invention and various changes and modifications may be made without departing from the spirit and scope of the invention, as defined by the appended claims.

What is claimed is:

1. An internal combustion engine comprising a combustion chamber formed by a cylinder bore closed at one end by a cylinder head and by a piston reciprocating in said cylinder bore, at least one intake passage serving said combustion chamber through an intake port valved by an intake valve, a throttle valve in said intake passage upstream of said intake port for controlling the flow through said intake passage into said combustion chamber, at least one exhaust passage serving said combustion chamber through an exhaust port, an exhaust valve for controlling the flow through said exhaust port, valve actuating means for operating said intake valve and said exhaust valve between their open and closed positions, the portion of said intake passage between said throttle valve and said intake port and the maximum volume of said combustion chamber when said piston is at bottom dead center position and the degree of overlap between the opening of said intake valve and the closing of said exhaust valve being controlled to a predetermined ratio.

2. An internal combustion engine as set forth in claim 1, further including a charge former for delivering fuel to the combustion chamber and wherein the lean limit air/fuel ratio is maintained on the lean side of stoichiometric by appropriately controlling the volume ratio and the valve overlap timing.

3. An internal combustion engine as set forth in claim 2, wherein the means for operating the intake valve and the exhaust valve includes variable valve timing means for varying the overlap duration between the opening of the intake valve and the closing of the exhaust valve.

4. An internal combustion engine as set forth in claim 2, the control includes means for varying the intake passage volume.

5. An internal combustion engine as set forth in claim 4, wherein the means for varying the intake passage volume includes volume control means disposed between the throttle valve and the intake port for varying the effective volume of the intake passage.

6. An internal combustion engine as set forth in claim 5, wherein the volume control means comprises a member selectively movable into and out of the intake passage for displacing a volume of the intake passage.

7. An internal combustion engine as set forth in claim 5, wherein the means for operating the intake valve and the exhaust valve includes variable valve timing means for varying the overlap duration between the opening of the intake valve and the closing of the exhaust valve.

8. An internal combustion engine as set forth in claim 7, wherein the overlap period between the opening of the intake valve and the closing of the exhaust valve is set in the range of 30–140° of output shaft angle.

9. An internal combustion engine as set forth in claim 1, wherein the volume ratio is control to be in the range of 0.15 to 0.45.

10. An internal combustion engine as set forth in claim 1, wherein the overlap period between the opening of the intake valve and the closing of the exhaust valve is set in the range of 30–140° of output shaft angle.

11. A method of operation an internal combustion engine comprising a combustion chamber formed by a cylinder bore closed at one end by a cylinder head and by a piston reciprocating in said cylinder bore, at least one intake passage serving said combustion chamber through an intake port valved by an intake valve, a throttle valve in said intake passage upstream of said intake port for controlling the flow through said intake passage into said combustion chamber, at least one exhaust passage serving said combustion chamber through an exhaust port, an exhaust valve for controlling the flow through said exhaust port, valve actuating means for operating said intake valve and said exhaust valve between their open and closed positions, said method comprising controlling the ratio of the portion of said intake passage between said throttle valve and said intake port (intake passage volume) and the maximum volume of said combustion chamber when said piston is at bottom dead center position (exhaust gas volume) to a predetermined ratio relative to the degree of overlap between the opening of said intake valve and the closing of said exhaust valve.

12. A method of operation an internal combustion engine as set forth in claim 11, further the step of delivering fuel to the combustion chamber and maintaining a lean limit air/fuel ratio on the lean side of stoichiometric by appropriately selecting the volume ratio and the valve overlap timing.

13. A method of operation an internal combustion engine as set forth in claim 12, further including the step of varying the valve timing for varying the overlap duration between the opening of the intake valve and the closing of the exhaust valve.

14. A method of operation an internal combustion engine as set forth in claim 12, further including the step of varying the intake passage volume.

15. A method of operation an internal combustion engine as set forth in claim 14, wherein the intake passage volume is varied by changing the effective volume of the intake passage.

16. A method of operation an internal combustion engine as set forth in claim 15, wherein the volume of the intake passage is varied by a member selectively movable into and out of the intake passage for displacing volume of the intake passage.

17. A method of operation an internal combustion engine as set forth in claim 15, further including the step of varying the valve timing for varying the overlap duration between the opening of the intake valve and the closing of the exhaust valve.

18. A method of operation an internal combustion engine as set forth in claim 11, wherein the volume ratio is in the range of 0.15 to 0.45.

19. A method of operation an internal combustion engine as set forth in claim 17, wherein the overlap period between the opening of the intake valve and the closing of the exhaust valve is set in the range of 30–140° of output shaft angle.

20. A method of operation an internal combustion engine as set forth in claim 11, wherein the overlap period between the opening of the intake valve and the closing of the exhaust valve is set in the range of 30–140° of output shaft angle.

* * * * *

UNITED STATES PATENT AND TRADEMARK OFFICE
CERTIFICATE OF CORRECTION

PATENT NO. : 6,131,554  
DATED : October 17, 2000  
INVENTOR(S) : Takeshi Ito et al.

Page 1 of 1

It is certified that error appears in the above-identified patent and that said Letters Patent is hereby corrected as shown below:

Column 8, claim 9,
Line 60, delete "control" and insert -- controlled --.

Column 9, claim 11,
Lines 13 & 14, delete "(intake passage volume)".
Line 16, delete "(exhaust gas volume)".

Signed and Sealed this

Eighteenth Day of December, 2001

Attest:

Attesting Officer

JAMES E. ROGAN
*Director of the United States Patent and Trademark Office*